Aug. 30, 1949.　　　F. A. G. PIRWITZ　　　2,480,604
BUILT-IN FLASHLIGHT AND SHUTTER SYNCHRONIZER
WITH ADJUSTABLE DELAY MEANS

Filed Nov. 7, 1946　　　2 Sheets-Sheet 1

INVENTOR
Friedrich A. Gustav Pirwitz

Harold E. Stonebraker
ATTORNEY

Aug. 30, 1949.　　　　F. A. G. PIRWITZ　　　　2,480,604
BUILT-IN FLASHLIGHT AND SHUTTER SYNCHRONIZER
WITH ADJUSTABLE DELAY MEANS
Filed Nov. 7, 1946　　　　　　　　　　　　　2 Sheets-Sheet 2
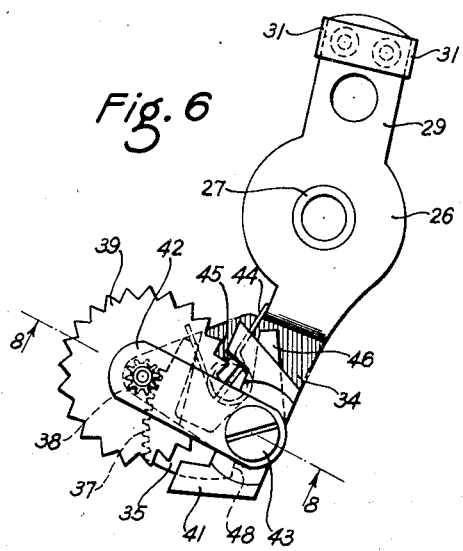
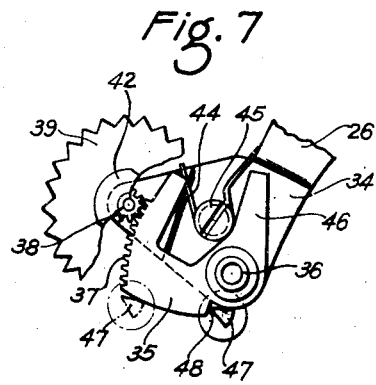
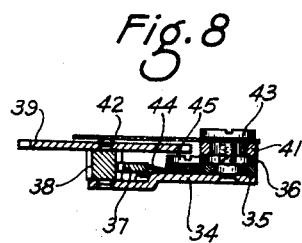
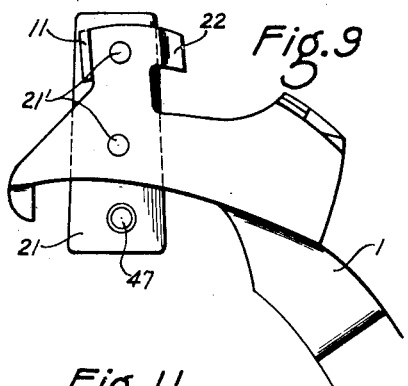
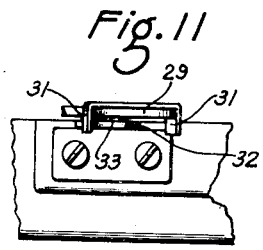
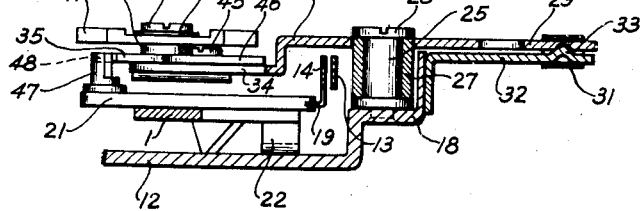
INVENTOR
Friedrich A. Gustav Pirwitz
BY Harold E. Stonebraker
ATTORNEY Patented Aug. 30, 1949

2,480,604

UNITED STATES PATENT OFFICE 2,480,604

BUILT-IN FLASHLIGHT AND SHUTTER SYNCHRONIZER WITH ADJUSTABLE DELAY MEANS

Friedrich A. Gustav Pirwitz, Rochester, N. Y., assignor to Wollensak Optical Company, Rochester, N. Y., a corporation of New York Application November 7, 1946, Serial No. 708,433

1 Claim. (Cl. 95—11.5)

This invention relates to a flashlight and shutter synchronizer, with particular reference to a shutter of the settable type such as illustrated in Patent No. 2,331,568, dated October 12, 1943, and has for its principal object to afford a practical and simple structure for the more generally used types of flash lamps and designed to coordinate accurately the closing of the flashlight circuit with the opening of the shutter so that the point of maximum light brilliancy coincides with the maximum shutter opening.

In general, lamps which reach their point of maximum brilliancy five milliseconds after closing of the circuit and lamps which reach their point of maximum illumination twenty milliseconds after closing the flashlight circuit are the two most popular types in the photographic field, and it is a more particular object of the invention to afford a flashlight synchronizer mechanism that cooperates accurately and properly with these two styles of lamps.

The invention has for a further purpose to afford a synchronizer mechanism adapted to a shutter having such a speed that when the flashlight circuit is closed instantly upon release of the master operating member, the shutter opens at the proper time to attain maximum exposure when a five millisecond lamp has reached its point of maximum brilliancy, and to combine therewith a retarding mechanism that can be quickly adjusted into or out of operative position, and which when in operative position delays travel of the master operating member sufficiently so that the maximum shutter opening coincides with the point of maximum brilliancy of a twenty millisecond lamp.

An additional object of the invention is to afford a practical and simple form of retarding mechanism that is easily adjustable to its different positions, and a master operating member provided with instrumentalities that cooperate properly with the flashlight circuit switch and the retarding mechanism.

Still another purpose of the invention is to afford a movable switch contact related to the master operating member in such a fashion as to close the flashlight circuit instantly upon release of the master operating member, while permitting setting movement of the master operating member without affecting the flashlight circuit.

To these and other ends, the invention consists in the construction and arrangement of parts that will appear clearly from the following description when read in conjunction with the accompanying drawings, the novel features being pointed out in the claim following the specification.

In the drawings:

Fig. 6 is an enlarged detail elevational view of the retarding mechanism and its support;

Fig. 7 is a view similar to Fig. 6, with parts broken away, and illustrating in dotted lines the position of the arm on the master operating member as the arm first engages the cam plate during movement to set position, and in full lines the position of the arm in relation to the cam plate when the master operating member is in set position;

Fig. 8 is a detail sectional view on the line 8—8 of Fig. 6 looking in the direction indicated;

Fig. 9 is an enlarged bottom plan view of one end of the master operating member;

Fig. 10 is an enlarged detail sectional view on the line 10—10 of Fig. 3, and

Fig. 11 is a side elevation of the shutter housing, partially broken away, looking from right to left of Fig. 10, and showing the adjusting finger piece of the retarding mechanism.

The invention may be carried out in a variety of ways, and for illustrative purposes, there is shown one practical embodiment in connection with the shutter mechanism forming the subject matter of Patent No. 2,331,568.

Figure 1:
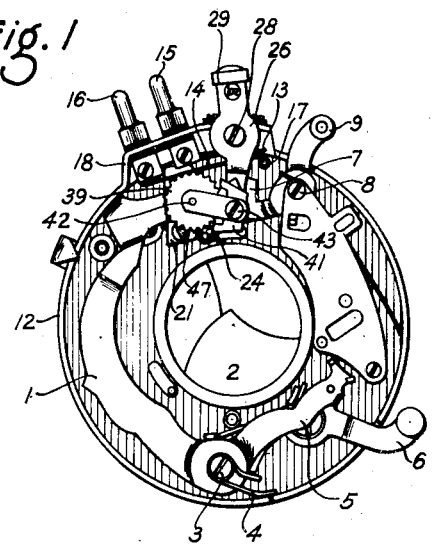
Fig. 1 is a plan view illustrating a shutter with parts removed, and showing applied thereto a preferred embodiment of the invention, the master operating member appearing in its normal released position and the retarding mechanism being adjusted into operative position to delay movement of the master operating member as when using a twenty millisecond lamp.
Figure 2:
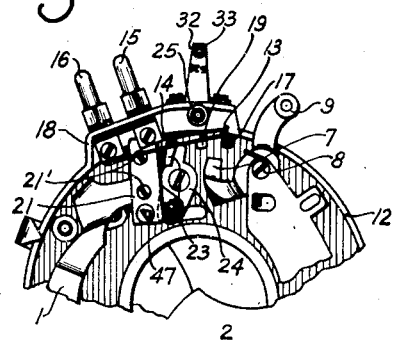
Fig. 2 is a similar view with the retarding mechanism removed, and showing the position of the parts therebeneath.
Figure 5:
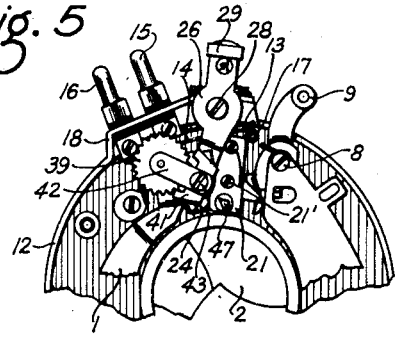
Fig. 5 is a view similar to Fig. 3 with the retarding mechanism adjusted out of operative position, to permit maximum speed of the master operating member when released as when using a five millisecond lamp.
Figure 3:
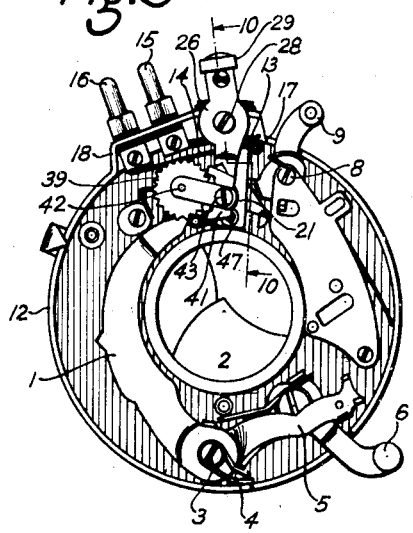
Fig. 3 is a view similar to Fig. 1, showing the position of the parts after the master operating member has been moved to set position.
Figure 4:
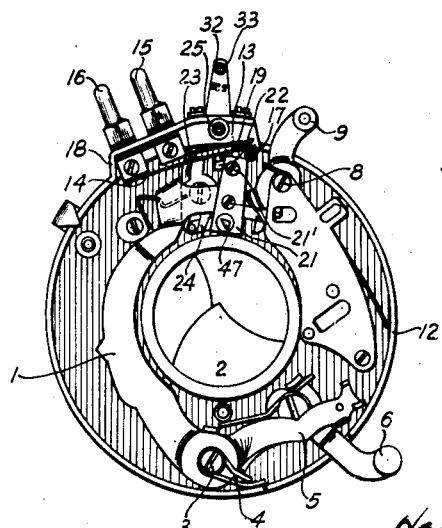
Fig. 4 is a view similar to Fig. 3 with the retarding mechanism removed, and showing the position of the parts therebeneath.

Referring more particularly to the drawings in which like reference numerals refer to the same parts throughout the several views, I designates the master operating member that controls operation of the shutter blades 2 and is pivoted at 3, being held in normal released position by the spring 4 and including an end portion 5 arranged for engagement by the setting lever 6 that is operated to move the master operating member from the released position of Figs. 1 and 2 to the set position of Figs. 3, 4 and 5. The master operating member is held in set postion by the tail piece 7 of the trigger that is pivoted at 8 and carries a finger piece 9 for operating it to release the master operating member, the tail piece 7 being engaged by the lug 11 on the master operating member to hold the latter in set position, all in accordance with the construction and operation of the aforesaid patent.

The parts thus far described are old and the present invention has to do with a flashlight circuit switch that is arranged to be engaged and operated by the master operating member instantly upon its release by the trigger, and when used with a five millisecond flash lamp having a short period of lag, the speed of the master operating member is such as to open the shutter at the proper moment to have the point of maximum light brilliancy coincide with the maximum shutter opening, and when a twenty millisecond lamp is used, there is provided a retarding mechanism that is readily adjustable into operative position and functions to delay movement of the master operating member, after closing of the flashlight circuit, sufficiently to compensate for the lag of a twenty millisecond lamp and effect maximum light brilliancy at the instant of maximum shutter opening, the retarding mechanism being designed to permit its quick adjustment to operative or inoperative positions while not interfering with the normal setting movement of the master operating member.

To accomplish these objectives, the housing 12 is provided with a switch comprising spring contacts 13 and 14 connected through insulating blocks with the jacks 15 and 16 respectively which receive a detachable plug and thus form part of the usual flashlight circuit. The contact 14 lies normally against a post 17, spaced from the contact 13, and is movable away from the post 17 into engagement with contact 13, when actuated, to close the flashlight circuit. The contacts 13 and 14, jacks 15 and 16, and the insulating blocks on which they are mounted, are all carried by an extension on the housing indicated generally at 18 and arranged in proximity to the trigger 9, so that the spring contacts 13 and 14 are in such position that when the trigger is operated, the flashlight circuit is closed instantly upon release of the master operating member during the first part of its movement, all of which is accomplished in the following manner.

The spring contact 14 carries an abutment or projection 19 near its free end and arranged to be engaged by the actuating portion on the master operating member, preferably in the form of a plate 21 of fiber or other insulating material that is fastened to the master operating member by the screws 21', the arrangement of these parts being such that when the master operating member is in set position, as shown in Fig. 4, the actuating portion or plate 21 is positioned behind and adjacent to the abutment 19 so that upon release of the master operating member, the actuating portion 21 moving against the abutment 19 instantly forces contact 14 outwardly into engagement with contact 13 and closes the flashlight circuit.

During the setting movement of the master operating member, the actuating portion 21 rides over the abutment 19 without effecting any movement of the contact 14, and this is accomplished by a lug 22 on the master operating member which engages and rides over the beveled surface 23 on the pivoted lever 24 forming part of the aforesaid patented structure to effect movement of the portion 22 of the master operating member and the actuating portion 21 laterally away from the plane of abutment 19 so that the actuating portion moves over the abutment without closing the circuit, and when the master operating member reaches its set position and the lug 11 drops behind the tail piece 7 of the trigger, the actuating portion 21 at the same time drops behind abutment 19 as shown in Fig. 4 and is then in position to actuate the movable contact and close the circuit instantly upon releasing operation of the trigger 9. For a flash lamp with a short lag, such as a five millisecond lamp, no retarding of the master operating member is required when the flashlight circuit is closed at the instant of release of the master operating member as just described, and when a lamp with greater lag is used such as a twenty millisecond lamp, it is desirable to delay movement of the master operating member slightly after the flashlight circuit is closed to compensate for the lag in the lamp, and this is accomplished in the present structure by a retarding mechanism that is adjustable to either operative or inoperative positions, as will now be described.

The extension 18 of the housing is provided with a stationary post 25 upon which is adjustably arranged a support in the form of a plate 26 that carries the retarding mechanism, and has fixed thereto a sleeve 27 journalled on the post 25 and held in place by a fastening screw 28. The support 26 also includes an extension or finger piece 29 by which it is adjustable, the finger piece 29 including depending stop lugs 31 engageable with the edges of an arm 32 fixed on the housing and projecting under the finger piece 29. The arm 32 is provided with a boss 33 that frictionally engages one of two recesses in the finger piece 29, as shown in Fig. 10, and thus holds the support and retarding mechanism in either adjusted position.

The retarding mechanism is mounted on the offset portion 34 of the support 26 and includes a cam plate 35 that is rotatably arranged on a post 36 and has formed thereon a toothed segment 37 engaging a pinion 38 mounted on an arbor and fixed to an escapement gear 39 which in turn is engaged by an escapement lever 41. The escapement lever is pivoted on the post 36 and held in place by strap 42 and screw 43, while 44 designates a coil spring surrounding a post 45 on the support, with one end engaging a portion of the plate and the other end engaging the toothed segment 37 and acting to retain the cam plate 35 in its normal position with the tail piece 46 against the post 45.

When the retarding mechanism is adjusted to operative position as in Figs. 1 and 3, the cam plate 35 is in position to be moved by the master operating member, and to accomplish this, the plate 21 of the master operating member is provided with an upstanding arm or pin 47 which engages the cam plate 35, in the manner shown in dotted lines in Fig. 7, during the setting movement of the master operating member, which when in fully set position, moves the arm 47 past the edge of cam plate 35 which moves outwardly in an anti-clockwise direction under the action of spring 44, and brings shoulder 43 into the path of arm 47 as shown in full lines in Fig. 7.

With the arm 47 in this position, when the master operating member is released by the trigger, the retarding mechanism is immediately brought into operation by engagement of arm 47 with shoulder 48, the arm 47 thus swinging the cam plate 35 and toothed segment 37 in a clockwise direction during return movement of the master operating member, simultaneously with closing of the flashlight circuit, and thus impeding movement of the master operating member sufficiently to delay maximum opening of the shutter until the lamp has reached the point of maximum brilliancy.

During the setting movement of the master operating member, the arm 47 engages and moves the cam plate 35 but this in no way interferes with the setting of the shutter, the function of the retarding mechanism being only to delay travel of the master operating member on its return movement.

The operation of the mechanism briefly is as follows: With the retarding mechanism adjusted into operative position, the master operating member is set in the usual way, and during its setting movement, the arm 47 causes a slight movement of the cam plate 35. When the master operating member is released, the flashlight circuit is instantly closed by engagement of actuating portion 21 with the abutment 19 on movable contact 14, and at the same instant or immediately after, the arm 47 engaging shoulder 48 starts to swing cam plate 35 of the retarding mechanism which delays movement of the master operating member and consequent opening of the shutter until the arm 47 has moved past the cam plate 35. This operation results when the retarding mechanism is adjusted to operative position for a twenty millisecond lamp, and when a five millisecond lamp is used, the retarding mechanism is adjusted to inoperative position by engaging finger piece 29 and moving it in a clockwise direction from the position shown in Fig. 3 to that shown in Fig. 5 where it is retained by engagement of the boss 33 with the corresponding opening in the finger piece 29, see Fig. 10. The finger piece and support for the retarding mechanism are thus retained in either adjusted position, while the downwardly extending lugs 31 engaging the sides of arm 32 limit movement of the retarding mechanism and support in either direction. When the retarding mechanism is adjusted to inoperative position, it is out of the path of the master operating member and has no effect on the shutter operation since the movement of the master operating member is in no wise affected by the retarding mechanism in that position.

While the invention has been described in connection with the particular construction shown, it is not confined to the details illustrated, and this application is intended to cover such modifications or changes as may come within the purposes of the improvement or the scope of the following claim.

I claim:

In a photographic shutter, the combination with a master operating member, of a switch actuating portion carried by said master operating member, a flashlight circuit switch including a relatively stationary contact and a movable spring contact movable transversely of the direction of travel of the master operating member and an abutment on said contact located adjacent to its free end in the path of said switch actuating portion, the switch actuating portion being movable in the same plane as said abutment, means located in the path of the master operating member acting to move said switch actuating portion laterally out of the plane of said abutment during setting movement of the master operating member, an arm on the master operating member, a stationary post, a support selectively positionable on said post, and a retarding mechanism mounted on said support and including a movable cam plate that lies in the path of said arm when the retarding mechanism is in operative position, a toothed segment formed on said cam plate, a post on which said cam plate is pivotally mounted on said support, a pinion pivotally mounted on said support and engaging said toothed segment, an escapement wheel fixedly connected to said pinion, an escapement lever pivoted on the aforesaid post and operatively engaging the escapement wheel, and spring means engaging said cam plate and maintaining it yieldably in its normal position.

FRIEDRICH A. GUSTAV PIRWITZ.

REFERENCES CITED

The following references are of record in the file of this patent:

UNITED STATES PATENTS

| Number | Name | Date |
| --- | --- | --- |
| 2,094,799 | Lingg et al. | Oct. 5, 1937 |
| 2,238,453 | Small | Apr. 15, 1941 |
| 2,298,107 | Carr | Oct. 6, 1942 |
| 2,326,077 | Steiner | Aug. 3, 1943 |
| 2,331,568 | Pirwitz | Oct. 12, 1943 |
| 2,384,639 | Riddell | Sept. 11, 1945 |